United States Patent
Subramanian et al.

(10) Patent No.: US 12,190,278 B1
(45) Date of Patent: Jan. 7, 2025

(54) CREATION OF A SHIPMENT USING GEO-LOCATION OF THE ASSET

(71) Applicant: ROAMBEE Corporation, Santa Clara, CA (US)

(72) Inventors: Vidya Subramanian, Santa Clara, CA (US); Sanjay Sharma, Santa Clara, CA (US); Shailesh Mangal, Santa Clara, CA (US)

(73) Assignee: ROAMBEE Corporation, Santa Clara, CA (US)

( * ) Notice: Subject to any disclaimer, the term of this patent is extended or adjusted under 35 U.S.C. 154(b) by 102 days.

(21) Appl. No.: 16/266,026

(22) Filed: Feb. 2, 2019

(51) Int. Cl.
G06Q 10/0833 (2023.01)
G06N 7/01 (2023.01)
H04W 4/029 (2018.01)

(52) U.S. Cl.
CPC ........... G06Q 10/0833 (2013.01); G06N 7/01 (2023.01); H04W 4/029 (2018.02)

(58) Field of Classification Search
CPC ................................................. G06Q 10/0833
See application file for complete search history.

(56) References Cited

U.S. PATENT DOCUMENTS

| | | | | |
|---|---|---|---|---|
| 8,392,116 B2* | 3/2013 | Lehmann | ........... | G01C 21/3617 701/524 |
| 8,514,082 B2* | 8/2013 | Cova | ...................... | G06Q 10/08 340/572.1 |
| 8,615,473 B2* | 12/2013 | Spiegel | .............. | G06Q 10/0835 705/332 |
| 9,846,854 B1* | 12/2017 | Lee | ..................... | G06Q 10/0833 |
| 2012/0303498 A1* | 11/2012 | Cova | ....................... | G06Q 10/08 340/572.1 |
| 2013/0238241 A1* | 9/2013 | Chelotti | ............... | G01C 21/362 701/533 |
| 2015/0262123 A1* | 9/2015 | Sharma | ................. | H04W 4/029 705/333 |
| 2016/0155084 A1* | 6/2016 | Mandanapu | ............. | H04B 5/77 705/333 |
| 2016/0371643 A1* | 12/2016 | Parruck | ................. | H04W 4/029 |
| 2018/0108242 A1* | 4/2018 | Wilkinson | ............. | G08B 31/00 |
| 2018/0322454 A1* | 11/2018 | Komoni | ................... | H04Q 9/00 |
| 2019/0080284 A1* | 3/2019 | Kim | ....................... | G06Q 50/28 |

OTHER PUBLICATIONS

Hilbrand et al., Shipment Localization Kit: An Automated Approach for Tracking and Tracing General Cargo, Sixth International Conference on the Management of Mobile Business (Year: 2007).*

* cited by examiner

Primary Examiner — Rupangini Singh

(57) ABSTRACT

A method, including, receiving a plurality of origin geolocation regions and a plurality of destination geolocation regions, associating a wireless tracker with an asset, wherein the wireless tracker emits a tracker location at a predetermined interval, receiving the emitted wireless tracker location, creating a shipment associated with the asset if the asset has egressed one of the plurality of origin geolocation regions, setting the one of the plurality of origin geolocation regions the asset egressed from as the asset origin, determining a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

15 Claims, 8 Drawing Sheets

CREATION OF A SHIPMENT USING GEO-LOCATION OF THE ASSET

TECHNICAL FIELD OF THE APPLICATION

This application relates to the creation of shipments, more specifically, the creation of a shipment through the utilization of an asset location.

BACKGROUND OF THE APPLICATION

Conventionally, the creation of a shipment order requires beforehand knowledge and input of a specific items origin, destination, time of egress and route. This knowledge and input typically was actuated by a human. Human shipment creation lends itself to errors which in turn lead to inefficiencies in the delivery process.

Accordingly, there is a need for systems, methods, and devices to create a shipment using geo-location of an origin, location information of the current whereabouts of an asset and historical data of previous shipments to probable destinations without the need for human intervention.

SUMMARY OF THE APPLICATION

A first example embodiment of the present application provide at least a method, including, receiving a plurality of origin geolocation regions and a plurality of destination geolocation regions, associating a wireless tracker with an asset, wherein the wireless tracker emits a tracker location at a predetermined interval, receiving the emitted wireless tracker location, creating a shipment associated with the asset if the asset has egressed one of the plurality of origin geolocation regions, setting the one of the plurality of origin geolocation regions the asset egressed from as the asset origin, determining a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

A second example embodiment of the present application provide at least a system, including a mobile device having a non-transitory computer readable medium comprising instructions that, when read by a processor, cause the processor to; receive a tracker location at the mobile device, determine a location of the mobile device when the tracker location was received and transmit the tracker location and the determined location of the mobile device to a cloud server.

A third example embodiment of the present application provide at least a non-transitory computer readable medium comprising instructions that, when read by a processor, cause the processor to perform receiving a plurality of origin geolocation regions and a plurality of destination geolocation regions, associating a wireless tracker with an asset, wherein the wireless tracker emits a tracker location at a predetermined interval, receiving the emitted wireless tracker location, creating a shipment associated with the asset if the asset has egressed one of the plurality of origin geolocation regions, setting one of the plurality of origin geolocation regions the asset egressed from as the asset origin, determining a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
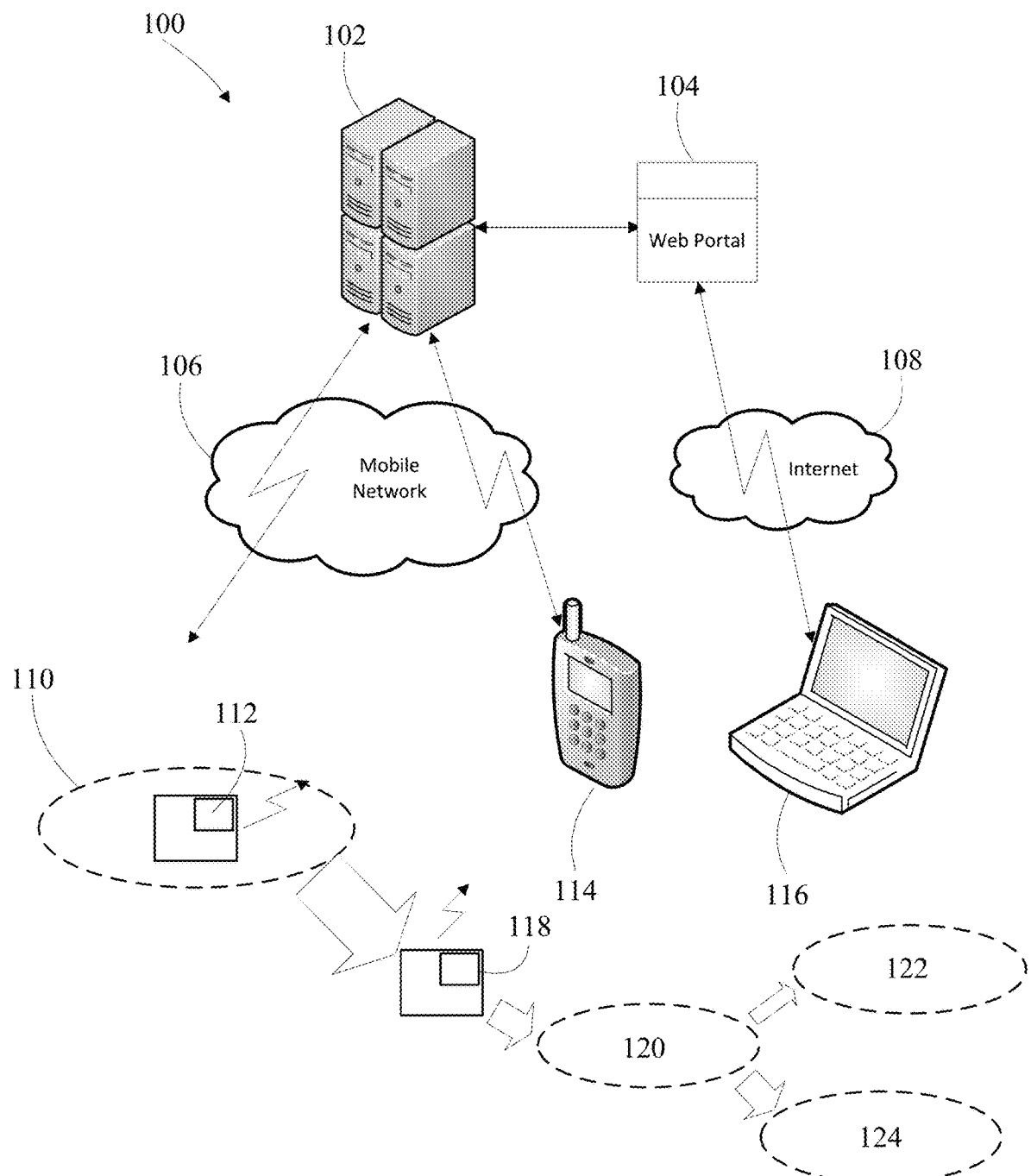
FIG. 1 is a functional block diagram of a system for creation of a shipment using geo-location of an asset, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE APPLICATION

The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

The key to gaining visibility into a shipment and subsequent package movement is the ability to detect package movement and then predict the journey of that package. This may eliminate the need to individually mark packages with shipment details such as the destination or route. The journey may be predicted through an understanding of the past movement of similar cargo and the continuous evaluation of the movement of similar cargo. If, for example, there is a pattern in movement of a certain cargo type, we may predict its destination with a reasonable score of accuracy. This score may increase as the journey progresses and the package nears its point of destination.

Ideally, every package will contain a sensor package reporting its location. This continuous update of location enables a predictive algorithm to determine possible final destinations. This automation may eliminate the fundamental scalability problem today, which is the manual scanning and entering shipment details for each package.

Embodiments of the present disclosure include systems, methods, and devices for creating a shipment using geolocation of an asset using a wireless tracker. The process includes, placing a wireless tracker with the asset or package to be tracked, where the wireless tracker transmits its location at a predetermined interval. The local server has origins and destinations configured as geo-location points. The local server checks to see if the wireless tracker is within a defined location or has moved outside of the location. When the local server detects that a wireless tracker has moved outside of a defined location it creates a shipment. The shipment will have the origin of the shipment as the last location that the bee was before moving out of the location and the destination as undetermined. As the asset moves further away from the origin the local server will determine possible destinations based on a past history of destinations from the previous origin, a past history of the type of asset from previous shipments and proximity of defined destinations that are in the direction of movement of the asset. The local server updates possible destinations as a shipment nears a defined destination.

An example method to automatically create a shipment monitoring trace based on the location and movement of the wireless tracker. Customers need not provide shipment information that includes the origin and destination. The platform automatically detects a wireless tracker leaving a location and starts a monitoring trace.

The overall components of the system include a local server, a cloud server that can accept data from the mobile application and a wireless tracker which may include a beacon such as a Bluetooth Low Energy (BLE) beacon.

The mobile application may run on a smartphone in the background and listens to BLE transmissions.

Creation of auto shipment eliminates the need for a manual creation of a shipment before an asset leaves a facility. Auto shipment creation may help scale the number of shipments processed and also help identify when the shipment will arrive at a destination without human intervention before a shipment start.

The system includes a mobile device having an application that receives a tracker location at the mobile device, determines a location of the mobile device when the tracker location was received and transmits the tracker location and the determined location of the mobile device to a cloud server.

The local server or cloud server has programming that remotely performs the tasks of receiving a plurality of origin geolocation regions and a plurality of destination geolocation regions, associating a wireless tracker with an asset, wherein the wireless tracker emits a tracker location at a predetermined interval, receiving the emitted wireless tracker location, creating a shipment associated with the asset if the asset has egressed one of the plurality of origin geolocation regions, setting one of the plurality of origin geolocation regions the asset egressed from as the asset origin, determining a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

FIG. 1 is a functional block diagram of a system 100 for tracking a shipment using a wireless tracker, in accordance with some embodiments. Such a system 100 includes one or more computer servers 102 that may host a web portal 104 or other user portal. A user device (114-116) such as a smartphone, tablet computer, laptop computer, and desktop computer may access the web portal 104 over the Internet 108. Alternatively, a user device 114 may access the computer server(s) 102 across a mobile network 106. In addition, an asset having a wireless tracker 112 is located within an origin geo-fence 110 and is in communication with the computer server(s) 102 over the mobile network 106 through the mobile device 114 or 116. As the asset leaves the geo-fence 110, the wireless transmitter 118 transmits an ID and data packet to various mobile devices or directly via RF signals to a cell tower, by WiFi, WiMax and the like to the cloud server. As the asset nears a set of possible destinations 120, 122 and 124, the system determines based on historical data the probability of which is the destination. The data is accessible by customers. When the asset reaches and stays at a destination region, an invoice is created. Such a system may be used by a shipping delivery company or a company that frequently ships various assets among the company's facilities that are separated by geographic distances.

The system 100 allows a shipment order to be automatically generated by the computer server(s) for a shipper based on the information received from the wireless tracker and wireless ranging module as well as a predefined list of shipment locations. A shipper may be a company or any entity that uses shipment services to deliver goods across geographical disparate shipment locations. For example, shipment locations for a shipper may correspond to manufacturing plant or research and development facilities.

In one embodiment, the wireless tracker 112 may determine its location using a global positioning system (GPS) device or communicating with one or more GPS devices over a network. Further, the wireless tracker may include a battery such that the wireless tracker 112 regulates battery usage based on the location of the wireless tracker 112. For example, when within a distance threshold of the shipment origin or shipment destination, the management module may request the communication module to determine a location of the wireless tracker 112 and ranging data at frequent intervals so as to provide frequent updates to a shipper on the location status of the shipment. However, beyond a distance threshold of the shipment origin and prior to a distance threshold of a shipment destination, frequent location status updates may not be needed by the shipper. Thus, the management module may not request the communication module to determine the location of the wireless tracker as frequently thereby regulating battery usage of the communication module. The location of the wireless tracker 112 may be forwarded to the computer server(s) 102 from the wireless tracker 112. Further, the computer server(s) may forward the location of the wireless tracker 112 to user devices (114-116).

In another embodiment, the wireless tracker 112 may include one or more sensors that are configurable. In addition, the wireless tracker 112 may determine a trigger event based on the location of the wireless tracker 112 or sensor information such as deceleration or movement of the truck door. In addition, the wireless tracker 112 may send or transmit a notification to the computer server 102 based on the trigger event. Further, the computer server(s) may forward the notification to user devices (114-116). The wireless tracker 112 may send or transmit sensor data to the computer server 102. Further, the computer server(s) may forward the sensor data or other sensor data to user devices (114-116).

In additional embodiments, the wireless tracker 112 is configured to receive and verify one or more codes for a chain of custody of the shipment. In one embodiment, the wireless tracker receives a code at a shipment origin and receives a code at a shipment destination. Based on such authentication, the wireless tracker may transmit a notification to the computer server(s) 102 verifying chain of custody.

Figure 2:
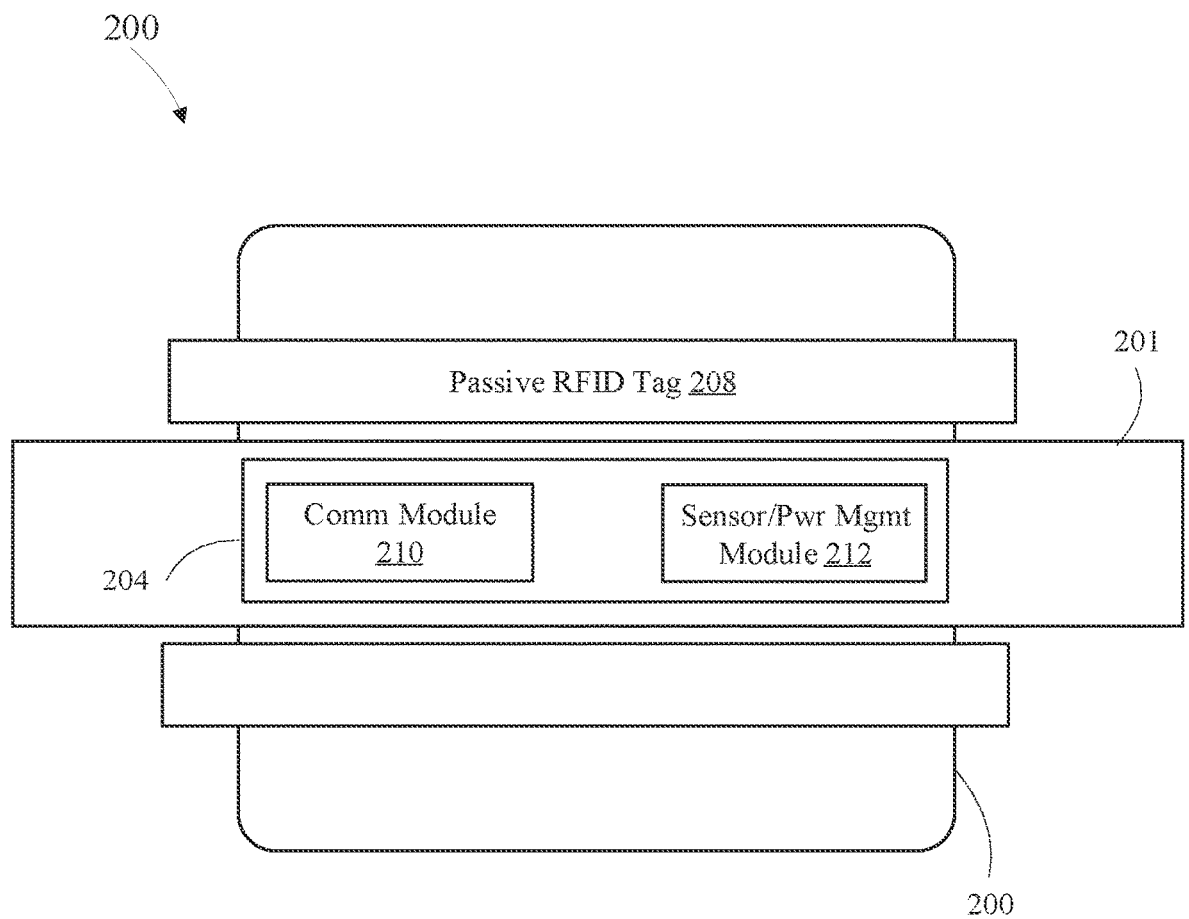
FIGS. 2-3 are functional block diagrams of a wireless tracker, in accordance with some embodiments.

FIG. 2 is a functional block diagram of a wireless tracker 200, in accordance with some embodiments. The wireless tracker 200 includes certain modules 201 with communication module 210 and authentication module 204 which may be bolted onto an integrated circuit board. A passive radio frequency identification (RFID) tag 208 is affixed to the truck door and programmed to have a unique identity/identification.

The wireless tracker 200 may be manufactured and operated in part by a third party manufacturer that may be used by a shipper or shipment delivery company. The third party manufacturer may own or operate one or more computer servers to communicate with the wireless tracker 200 over one or more wireless communication networks using the communication module 210. Further, the communication module 210 may be include one or communication interfaces configured to communicate over various wireless networks such as GPS, Zigbee, Zwave, WiFi, cellular/mobile, Bluetooth, WiMAX or any other wireless communication network. In addition, the communication module may have an interface to communicate with other devices over a wired network or a wired interface such as an Ethernet cable or USC interface. Such wired connections may be implemented when first configuring the wireless tracker 200 by the third party manufacturer prior to use.

In some embodiments, the communication module 210 is configured to determine a current location of the wireless tracker device at one or more intervals wherein the one or more intervals are based on a delivery route of the shipment. For example, the communication module 210 may be configured (by the management module 212) to determine the location of the wireless tracker frequently within a distance threshold of the shipment origin or shipment destination. However, the communication module 210 may be configured to determine the location of the wireless tracker not as frequently beyond the distance threshold of the shipment origin and prior to the distance threshold of the shipment destination. Although such a configuration manages battery life, such a configuration also avoids a situation when a user defines an alert condition when an asset enters and exits a specified geographic boundary that may not have been provided if the update interval was simply 30 minutes. In such a scenario, if the asset enters and exits the specified geographic boundary within 30 minutes then the tracing device fails to provide an update.

In an alternative embodiment, the management module 212 may receive sensor information from one or more sensors of the wireless tracker 200 at different time intervals. However, the management module may request sensor information for specific sensors only after the wireless tracker has moved to a different location thereby regulating battery life. The management module 212 may be configured to only retrieve sensor information when the wireless tracker has moved to a new location instead of at certain time intervals (e.g. every 30 minutes). Thus, the wireless tracker may stay at a certain location for a period of time (e.g. longer than 30 minutes) and the management module regulates battery usage/life by only gathering sensor data when the wireless tracker has changed location. However, in other embodiments, the management module may request sensor information from sensors at certain time intervals associated or not associated with the location of the wireless tracker.

The wireless tracker 200 may have one or more sensors that include but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, ranging and presence, etc. In one embodiment the sensor may include a location sensor. In another embodiment, the location sensor may be the communication module 210 communicating with a GPS device to retrieve location information of the wireless tracker 200. The management module 212 may be configured to configure the one or more sensors as well as receive sensor information from the one or more sensors. Further, the management module 212 may determine a trigger event based on the location of the wireless tracker device and/or sensor information. In addition, the management module 212 may transmit a notification to a computer server through the communication module based on the trigger event that is forwarded to a user device.

Alternatively, sensor information may be provided to a computer server to determine a trigger event or notify the user. Moreover, a trigger event includes, but is not limited to, a shipment exiting shipment origin, delay at an intermediate location, traveling after a delay, temperature deviation, humidity deviation, route deviation, accident to delivery vehicle, tampering and shock to the delivery vehicle. Sensor may include, but are not limited to, temperature sensors, humidity sensors, location sensors, proximity sensors, accelerometers, acoustic, sound, vibration, automotive, transportation, chemical, electric current, electric potential, magnetic, radio, environment, weather, moisture, flow, fluid velocity, ionizing radiation, subatomic particles, navigation instruments, position, angle, displacement, distance, speed, acceleration, optical light, imaging, photon, pressure, force, density, level, thermal, heat, temperature, proximity, anti-tampering, ranging and presence, etc.

The authentication module 204 is used to track the chain of custody of the shipment associated with the wireless tracker 200. In one embodiment, a shipper at a shipment origin may enter an authentication code into the authentication module 204. The authentication module 204 verifies the code either locally or transfers the authentication code to a computer server for verification. Once the authentication code is verified, the shipment with the wireless tracker 200 is shipped to the destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 and verified (either locally or at a server). In addition, the verification may include determining whether the wireless tracker 200 is within a distance threshold of the shipment destination in accordance with the shipment order.

The authentication code may or may not be on a package slip. Further, the authentication code may include, but is not limited to, an alphanumeric code (that can be randomly generated), a text code, a graphical code (such as bar code or QR code), and biometric code (such as a fingerprint, signature, retinal scan, facial recognition, voice recognition, etc.).

In further embodiments, the management module 212 may determine that the location of the wireless tracker 200 is within a distance threshold of the shipment destination. Further, the management module 212 may determine that a code was received by the authentication module 204 within a time threshold. The distance threshold and time threshold may be parameters for the wireless tracker that are configurable by a shipper or use of the wireless tracker 200. If the code was determined to be received by the authentication module 204 within both the distance threshold and time threshold then the management module 212 may transmit a notification to a computer server through the communication module 210 verifying chain of custody. Such a notification may be sent to a user device. However, if the code was not received by the authentication module 204 either within a distance threshold or within a time threshold then the management module 212 transmit a notification to a computer server through the communication module 210 indicating a break in the chain of custody that is forwarded to a user device.

In other embodiments, the wireless tracker 200 may determine tampering such as separating the wireless tracker from the shipment. Such determination may involve processing sensor information and other parameters such as, but not limited to, ambient light, conductive tape, irregular motion detection, position, loading and orientation of the goods of the shipment.

In further embodiments, the wireless tracker 200 may implement multi-dimensional tracking such as to determine and provide the ability to configure the rules of tracking based on but not limited to if-else-while of various parameter like speed, altitude, temperature, pressure, location, range of cargo from the back door and change the behavior of tracking. For example, international tracking intervals is changed while at sea, dynamically changing the tracking geo-boundaries and conditions.

In additional embodiments, the wireless tracker 200 can associated its ID (e.g. RFID) with a shipment order information such as order number, purchase order number, Serial Shipment Container Code (SSCC), Billing of Lading number, Lorry Receipt (LR) number, Shipment Manifest number and others. Also, the wireless tracker is associated with the order information of the shipment in-transit for easy lookup. The wireless tracker may be associated with a wireless tracker identifier (e.g. RFID) such that the wireless tracker identifier is associated with shipment order information. Further, a wireless tracker 200 provides the condition of the shipment in transit such as if the shipment is not within its shipping temperature, humidity, moisture limits, load constraints or if the shipment was moved from one transport carrier to another, or the shipment was not handled properly.

The RFID tag 208 is used to uniquely identify the wireless tracker 300. Thus, when the RFID tag is read at the shipment origin, the RFID tag is stored by the computer server and associated with the shipment. The RFID tag 208 may be read again at the shipment destination to verify the RFID tag is the same as the one read at the shipment origin. The presence of RFID tag allows the wireless tracker owner to check in wireless tracker devices received after use or check out wireless tracker devices to customers for use with ease. It also provides real time inventory reconciliation and verification of device inventory at each wireless tracker device storage location.

Figure 3:
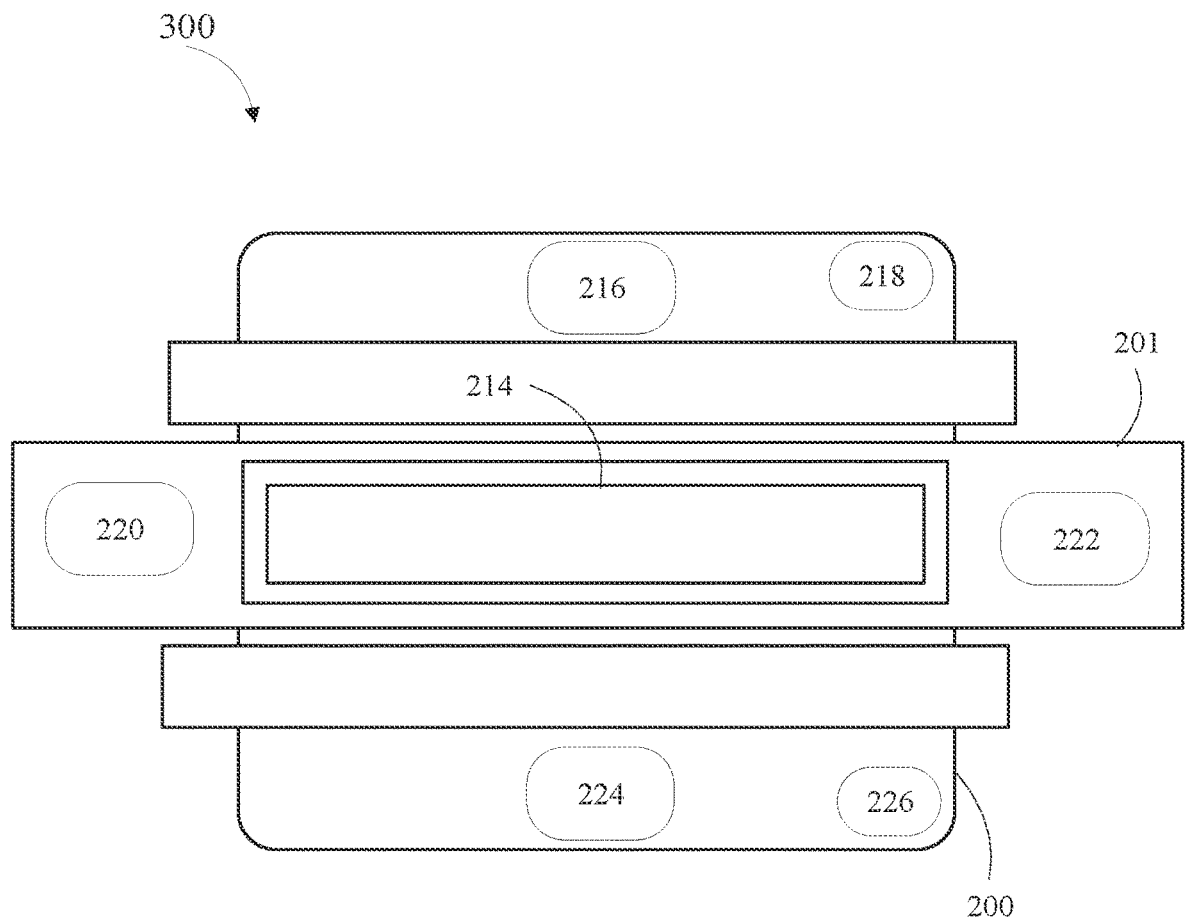

Referring to FIG. 3, a side of the wireless tracker 200 may have one or more panels (216-226) as well as a foam pad 214. The foam pad 214 may be used to cushion or otherwise reduce vibration impacting the wireless tracker 200.

Figure 4:
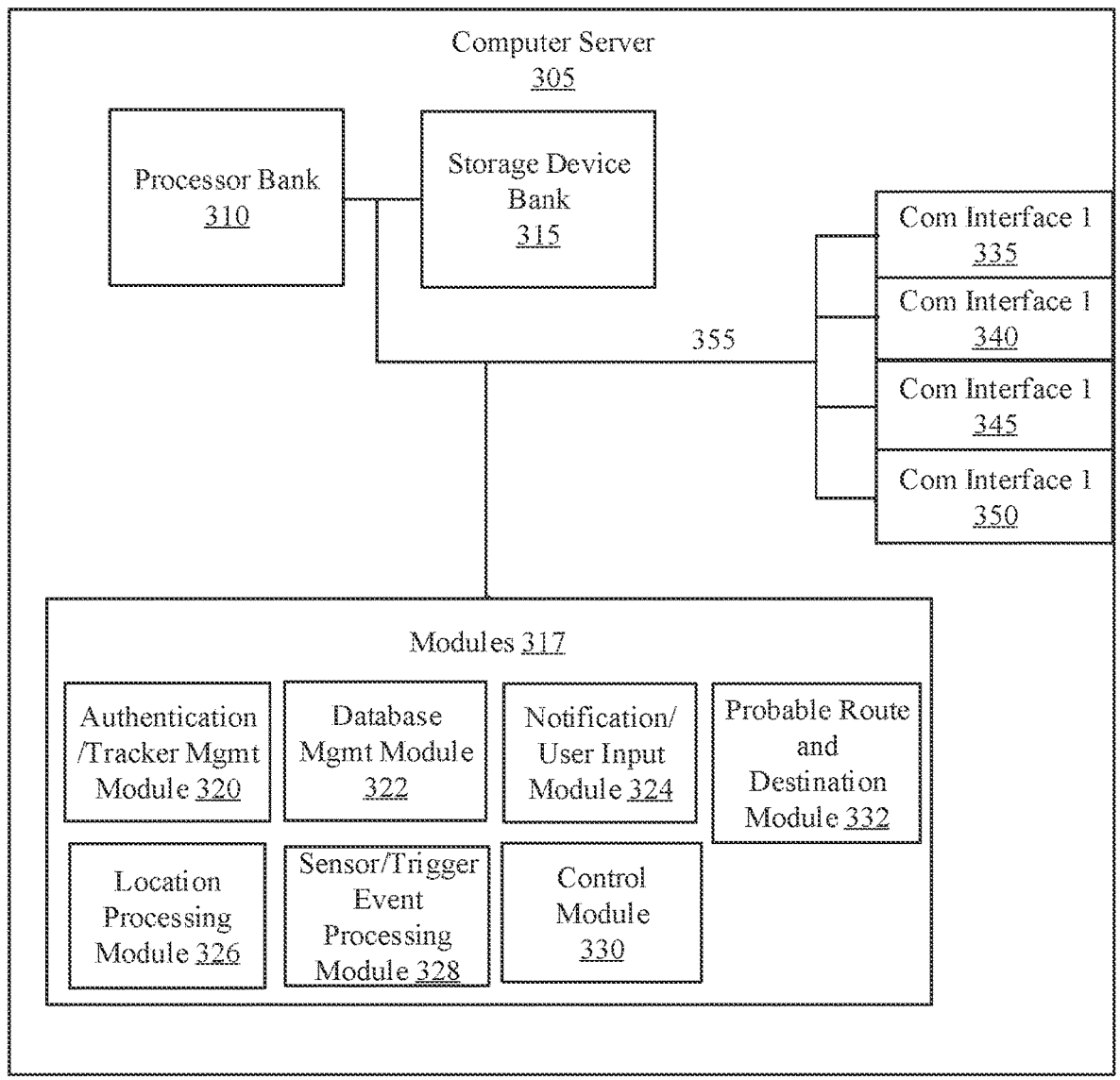
FIG. 4 depicts a functional block diagram of a server system used in creation of a shipment using geo-location of an asset, in accordance with some embodiments.

FIG. 4 is functional block diagram of a computer server used in tracking a shipment using a wireless tracker, in accordance with some embodiments. Such a server 305 may be used in a system shown in FIG. 1. The computer server 305 may include several different components such as a processor bank 310, storage device bank 315, one or more software applications, which may be executed by a processor. Thus, the combination of the software applications as well as the processor and any other hardware form specifically-configured modules 317. The computer server 305 also has one or more communication interfaces (335-350). The processor bank 310 may include one or more processors that may be co-located with each other or may be located in different parts of the computer server 305. The storage device bank 315 may include one or more storage devices. Types of storage devices may include electronic memory, optical memory, and removable storage media. The one or more modules 317 may include, but are not limited to, authentication/tracker management module 320, database management module 322, notification/user input module 324, location processing module 326, sensor/trigger event processing module 328, and control module 330. The modules 317 may be implemented by the one or more processors in the processor bank 310. The computer server 305 and any other server described in the present disclosure may include a database stored in a storage device bank or may be coupled to a database. Further, such a computer server may be part of a computer server system described herein that may include one or more computer servers and one or more databases. In the present disclosure, a computer server may, but not always, refer to embodiments that include a computer server system having one or more computer servers and one or more databases coupled to each other. The one or more computer servers may be co-located with each other or distributed among different locations. Likewise, the one or more one or more databases may be co-located with each other or distributed among different locations. In further embodiments, some of the one or more computer servers may be co-located and coupled to the one or more databases while in additional embodiments some of the one or more computer servers may be coupled to the one or more databases each of which are placed in different location. In still further embodiments, a computer server system may refer to at least one of a computer server and a database. The components shown in FIG. 3 may be located in one computer server or be distributed among more than one computer server and/or databases.

The authentication/tracker management module 320 may perform, in some embodiments, the functions of the authentication module 204 and/or the management module 212 of a wireless tracker described herein. Thus, the authentication/tracker management module 320 may be used in tracking the chain of custody of the shipment associated with a wireless tracker. In one embodiment, a shipper at a shipment origin may enter an authentication code into the authentication module of the wireless tracker. Further, the wireless tracker (via its communication module) may transmit the authentication code to computer server 305. The authentication/tracker management module 320 verifies the authentication code and may provide the wireless tracker and/or a user device with a notification that the authentication code has been verified. Once, the authentication code is verified, the shipment with the wireless tracker is shipped to a shipment destination. In one embodiment, a packing slip inside the shipment includes another authentication code. Upon receiving the shipment at the shipment destination, a receiver of the shipment may open the shipment to access the authentication code on the packing slip. The authentication code is entered into the authentication module 204 of the wireless tracker. Further, the wireless tracker (via its communication module) may transmit the authentication code to computer server 305. The authentication/tracker management module 320 verifies the authentication code received at the shipment destination. Further, a notification may be sent to the wireless tracker or the user device that the chain of custody of the shipment has been verified.

The location processing module 326 may determine the location of the shipment based on one or more current locations received from the wireless tracker. Further, the location processing module 326 may access a Global Positioning System (GPS) information (e.g. map information) as well as geo-zone information surrounding one or more shipment locations (i.e. shipment origin, shipment destination, intermediate shipment locations). The location processing module 326 may process such information to determine one or more trigger events. Such trigger events may use the location processing module 326 to communicate with the notification/user input module 324 to send a notification based on the trigger event to a user device. In addition, once a location is determined by the location processing module 326, such location and associated location information may be provided to the authentication/tracker management module for further processing or the notification/user input module 324 to send a notification to the user device. For example, the location processing module 326 may receive a location of the shipment from the wireless tracker that indicates that the shipment is at the shipment origin. Further, the location processing module 326 has access to information that there is geo-zone surrounding the shipment origin. Subsequently, the location processing module 326 may receive a location of the shipment from the wireless tracker that indicates that the shipment has exited the geo-zone surrounding the shipment origin. The location processing module 326 determines that such an event is a trigger event and thereby communicates with the notification/user input module 324 to send a notification to the user device that the shipment has left the shipment origin.

In further embodiments, the authentication/tracker management module 320 may receive the location of the wireless tracker from the location processing module 326 and may determine that the location of the wireless tracker is within a distance threshold of the shipment destination. Further, the authentication/tracker management module 320 may determine that a code was received by the authentication/tracker management module 320 within a time threshold. The distance threshold and time threshold may be parameters that are configurable by a shipper or user of the wireless tracker. If the code was determined to be received and verified by the authentication/tracker management module 320 within both the distance threshold and time threshold then the authentication/tracker management 320 may transmit a notification (via the notification/user input module 324) to the user device verifying chain of custody. However, if the code was not received by the authentication/tracker management module 320 either within a distance threshold or within a time threshold then the authentication/tracker management module 320 transmit a notification (via the notification/user input module 324) to the user device indicating a break in the chain of custody.

In some embodiments, the authentication/tracker management module 320 is configured to determine a current location of the wireless tracker device at one or more intervals wherein the one or more intervals are based on a delivery route of the shipment. For example, the authentication/tracker management module 320 may configure the wireless tracker to determine its location frequently within a distance threshold of the shipment origin or shipment destination. However, the authentication/tracker management module 320 may configure the wireless tracker to determine its location infrequently beyond the distance threshold of the shipment origin and prior to the distance threshold of the shipment destination. Although such a configuration manages battery life of the wireless tracker, such a configuration also avoids a situation when a user defines an alert condition when an asset associated with the wireless tracker enters and exits a specified geographic boundary that may not have been provided if the update interval was simply 30 minutes. In such a scenario, if the asset enters and exits the specified geographic boundary within 30 minutes then the tracing device fails to provide an update.

In other embodiments, the wireless tracker provides an update regarding remaining battery life of the wireless tracker to the computer server 305. Further, the remaining battery life may be forwarded to a user device by the notification/user input module 324. The authentication/tracker management module 320 may determine to adjust (automatically or based on user input in response to the notification of remaining battery life) the frequency of location and sensor updates of the wireless tracker to better manage the remaining battery life and provides such configuration information to the wireless tracker, accordingly. Further based on a route of the wireless tracker (the route may be preprogrammed into the computer server 305 or determined by the computer server 305 based on one or more location updates provided by the wireless tracker), may provide configuration information to regulate the battery life of the wireless tracker. In additional embodiments, the computer server 305 may receive and process one or more location updates from the wireless tracker to determine a route deviation of the wireless tracker. The computer server may provide additional configuration information to further regulate the battery life based on the route deviation.

In further embodiments, the computer server 305 may receive the current location of the wireless tracker and the location processing module 326 determines that the current location of the wireless tracker is a shipment destination.

In additional embodiments, the computer server 305 may determine tampering of the wireless tracker such as separating the wireless tracker from the shipment. Such determination may involve processing sensor information and other parameters such as, but not limited to, ambient light, conductive tape, irregular motion detection, and orientation of the goods of the shipment.

In further embodiments, the computer server 305 may implement multi-dimensional tracking of the wireless tracker such as to determine and provide the ability to configure the rules of tracking based on but not limited to if-else-while of various parameter like speed, altitude, temperature, pressure, location and change the behavior of tracking. For example, international tracking intervals is changed while at sea, dynamically changing the tracking geo-boundaries and conditions.

In additional embodiments, the wireless tracker can associated its ID (e.g. RFID) with a shipment order information such as order number, purchase order number, Serial Shipment Container Code (SSCC), Billing of Lading number, Lorry Receipt (LR) number, Shipment Manifest number and others, and provides such information to the computer server for further processing and notification to the user. Also, the wireless tracker is associated with the order information of the shipment in-transit for easy lookup. Further, a wireless tracker provides to the computer server 305 the condition of the shipment in transit such as if the shipment is not within its shipping temperature, humidity, moisture limits, or if the shipment was moved from one transport carrier to another, or the shipment was not handled properly such that the computer server notifies or takes action on such information.

The database management module 322 manages the storage and access of information related to the operation of the wireless tracker or shipment information. For example, the database management module 322 may store one or more locations of the shipment that is provided by a wireless tracker. In addition, the database management module 322 may store information from one or more sensors coupled to and provided by the wireless tracker. Such location information and sensor information may be used to determine a trigger event to notify the shipper.

The notification/user input module 324 may perform several different functions. One such function may be to receive user input from a user device. Such user input may be configuration parameters for operating the wireless tracker. These may include specified times or locations to query the wireless tracker for sensor information, location, or other status information. Another function of the notification/user input module 424 to provide a notification based on a trigger event to the user device. A notification may be generated based on a trigger event determined by the different modules of the computer server 305 such as, but not limited to, the authentication/tracker management module 320, location processing module 326, and the sensor/trigger event processing module 328.

The sensor/trigger event processing module 328 may receive sensor information from the wireless tracker. Further, the sensor/trigger event processing module may determine certain trigger events based on the received sensor information and send a notification (via the notification/user input module 324) to a user device. In addition, the sensor/trigger event processing module may be programmed or receive configuration parameters to be forwarded to the wireless tracker for its operation. For example, the configuration parameters may include time and location of providing location and other sensor information as well as at which time periods to operate the different sensors to regulate battery life.

In some embodiments, the computer server 305 may receive a notification from the wireless tracker. Further, the computer server 305 may process the information in the notification based on configuration parameters and transmit information to the wireless tracker to take some further action. For example, a user may be tracking a shipment traveling from Las Vegas to Washington, D.C. (by air transport) with an intermediate stop in Dallas during the winter season. However, the computer server 305 may receive a notification that the shipment was diverted to have an intermediate stop at Chicago instead of Dallas due to severe weather conditions surrounding the Dallas area. The computer server 305 may have configuration information that includes that the shipment may be temperature sensitive and cannot be in environment less than 32 degrees Fahrenheit. Further, the computer server may have additional configuration information that if the shipment is at a location above a certain latitude or in a certain geographical area, to request the wireless tracker take a temperature reading with its temperature sensor and provide such temperature sensor information to the computer server 305. Further, if the computer server 305 is notified that the temperature is less than 32 degrees Fahrenheit, then the computer server may send a notification to shipper personnel to place the shipment in a warmer environment.

The control module 330 includes software and hardware functions that assist in performing certain tasks for the computer server 305 such as providing access to a communication link (e.g. wired, wireless, Bluetooth, infra-red, RF, etc.), executing an operating system, managing software drivers for peripheral components, and processing information. In addition, the control module 330 may also include software drivers for peripheral components, user interface computer programs, debugging and troubleshooting software tools. Also, the control module 330 may include an operating system. Such operating systems are known in the art for computer server 305 but may also include computer operating systems (e.g. Windows, Linux, UNIX, and MacOS, etc.).

The probable route and destination module 332 includes software and hardware functions that assist in performing certain tasks for the computer server 305 such as storing geo-location of historical origins and destinations, historical data from previous shipments from that origin, historical data from previous shipment logistical data and maps of directions and geo-locations of the historical destinations. The computer server 305 may also perform the tasks of receiving a plurality of origin geolocation regions and a plurality of destination geolocation regions, associating a wireless tracker with an asset, wherein the wireless tracker emits a tracker location at a predetermined interval, receiving the emitted wireless tracker location, creating a shipment associated with the asset if the asset has egressed one of the plurality of origin geolocation regions, setting one of the plurality of origin geolocation regions the asset egressed from as the asset origin, determining a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

Each of the communication interfaces (335-350) may be software or hardware associated in communicating to other devices. The communication interfaces (335-350) may be of different types that include a user interface, USB, Ethernet, WiFi, WiMax, wireless, optical, cellular, or any other communication interface coupled to a communication network. One or more of the communication interfaces (335-350) may be coupled to a user interface known in the art.

An intra-device communication link 355 between the processor bank 310, storage device bank 315, modules 317, and communication interfaces (335-350) may be one of several types that include a bus or other communication mechanism.

Figure 5:
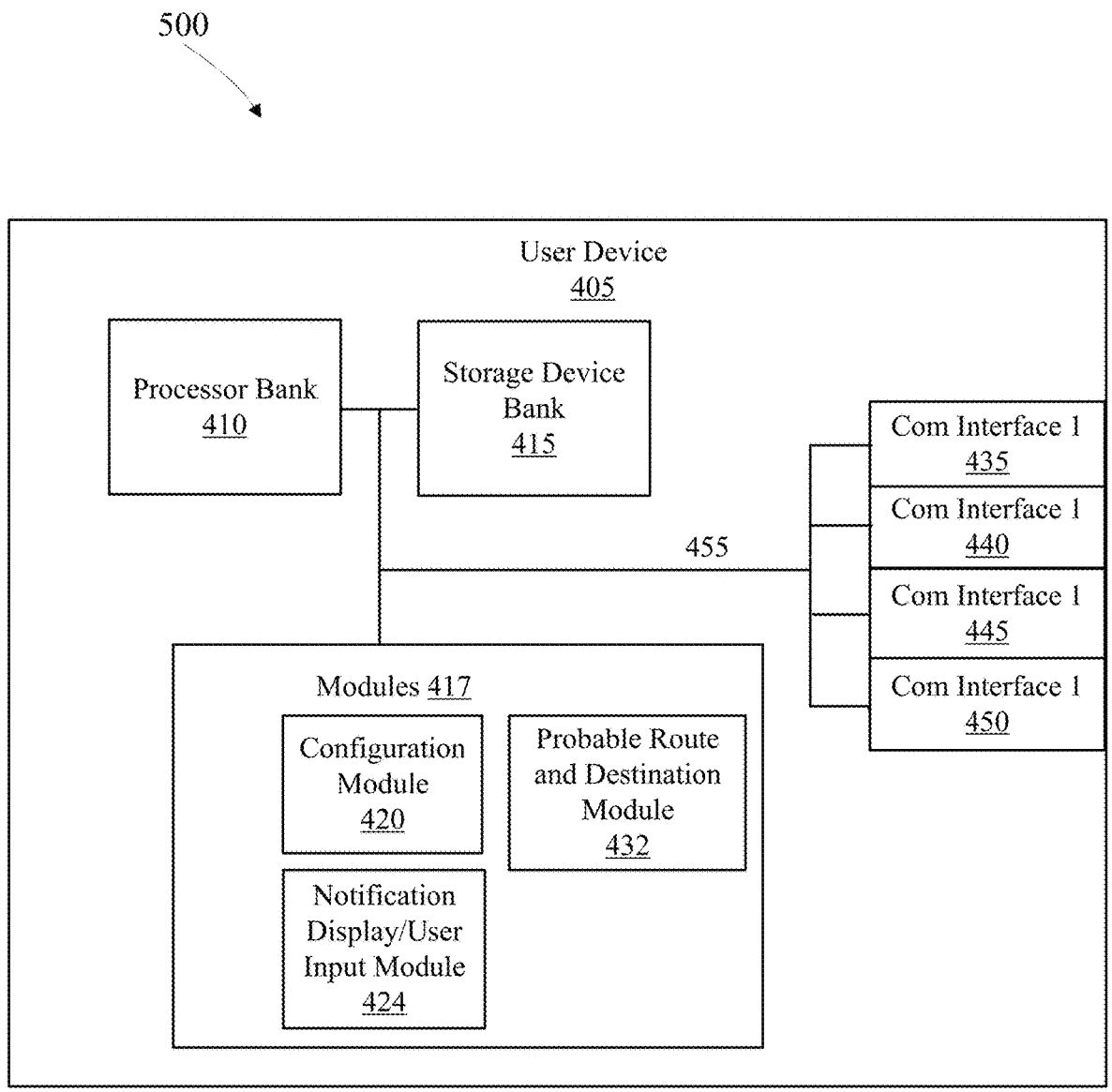
FIG. 5 depicts a functional block diagram a device used in creation of a shipment using geo-location of an asset, in accordance with some embodiments.

FIG. 5 is functional block diagram of a user computing device 405 for providing configuration information to a wireless tracker as well as receiving trigger event notifications based on wireless tracker information, in accordance with some embodiments. Such a user device 405 may be used in a system shown in FIG. 1. The user device 405 may include several different components such as a processor bank 410, storage device bank 415, one or more software applications, which may be executed by a processor. Thus, the combination of the software applications as well as the processor and any other hardware form specifically-configured modules 417. The user device 405 also has one or more communication interfaces (435-450). The processor bank 410 may include one or more processors that may be co-located with each other or may be located in different parts of the shipper computing device 405. The storage device bank 415 may include one or more storage devices. Types of storage devices may include electronic memory, optical memory, and removable storage media. The one or more modules 417 may include, but are not limited to, a configuration module 420 and a notification display/user input module 424. The modules 417 may be implemented by the one or more processors in the processor bank 410. Examples of user devices, include, but are not limited to, desktop computers, laptop computers, tablet computers, smartphones, and any other computing devices.

A user may provide configuration information for a wireless tracker. Such user input may be entered into a user interface (one or of the communication interfaces (435-450)) and may be received by the notification display/user input module 424. Such configuration information may include time and location of providing location and other sensor information of the wireless tracker as well as at which time periods to operate the different sensors of the wireless tracker to regulate its battery life. The configuration module 420 may process such configuration information and determine whether such user input may conflict with current operation of the wireless tracker or with a prior configuration of the wireless tracker. If so, the configuration module may provide a notification on the notification display 424. If not, the configuration information may then be transmitted to one or more computer servers over one of the communication interfaces (435-450). Also, the notification display/user input module 424 may receive a notification from the computer server(s) via the communication interface (435-450) and display such a notification on a user interface.

In some embodiments, the user device 405 may receive a notification from the wireless tracker (via a computer server) and present the notification to a user on a user device display. Further, the user may enter information into a user device user interface that may be transmitted to the wireless tracker (via the computer server) to take some further action. For example, a user may be tracking a shipment traveling from Las Vegas to Washington, D.C. (by air transport) with an intermediate stop in Dallas during the winter season. However, the user device 405 may receive a notification that the shipment was diverted to have an intermediate stop at Chicago instead of Dallas due to severe weather conditions surrounding the Dallas area. The shipment may be temperature sensitive and cannot be in environment less than 32 degrees Fahrenheit. The user may input information that is transmitted to the wireless tracker (via the computer server) to request the wireless tracker take a temperature reading with its temperature sensor and provide such temperature sensor information to the user device (via the computer server). Further, if the user is notified that the temperature is less than 32 degrees Fahrenheit, then the user may enter information to the computer server to notify shipper personnel to place the shipment in a warmer environment.

Each of the communication interfaces (435-450) may be software or hardware associated in communicating to other devices. The communication interfaces (435-450) may be of different types that include a user interface, USB, Ethernet, WiFi, WiMax, wireless, optical, cellular, or any other communication interface coupled to a communication network. One or more of the communication interfaces (435-450) may be coupled to a user interface known in the art.

The probable route and destination module 432 includes software and hardware functions that assist in performing certain tasks for the mobile device such as receiving a tracker location at the mobile device, determining a location of the mobile device when the tracker location was received and transmitting the tracker location and the determined location of the mobile device to the cloud server.

An intra-device communication link 455 between the processor bank 410, storage device bank 415, modules 417, and communication interfaces (435-450) may be one of several types that include a bus or other communication mechanism.

Figure 6:
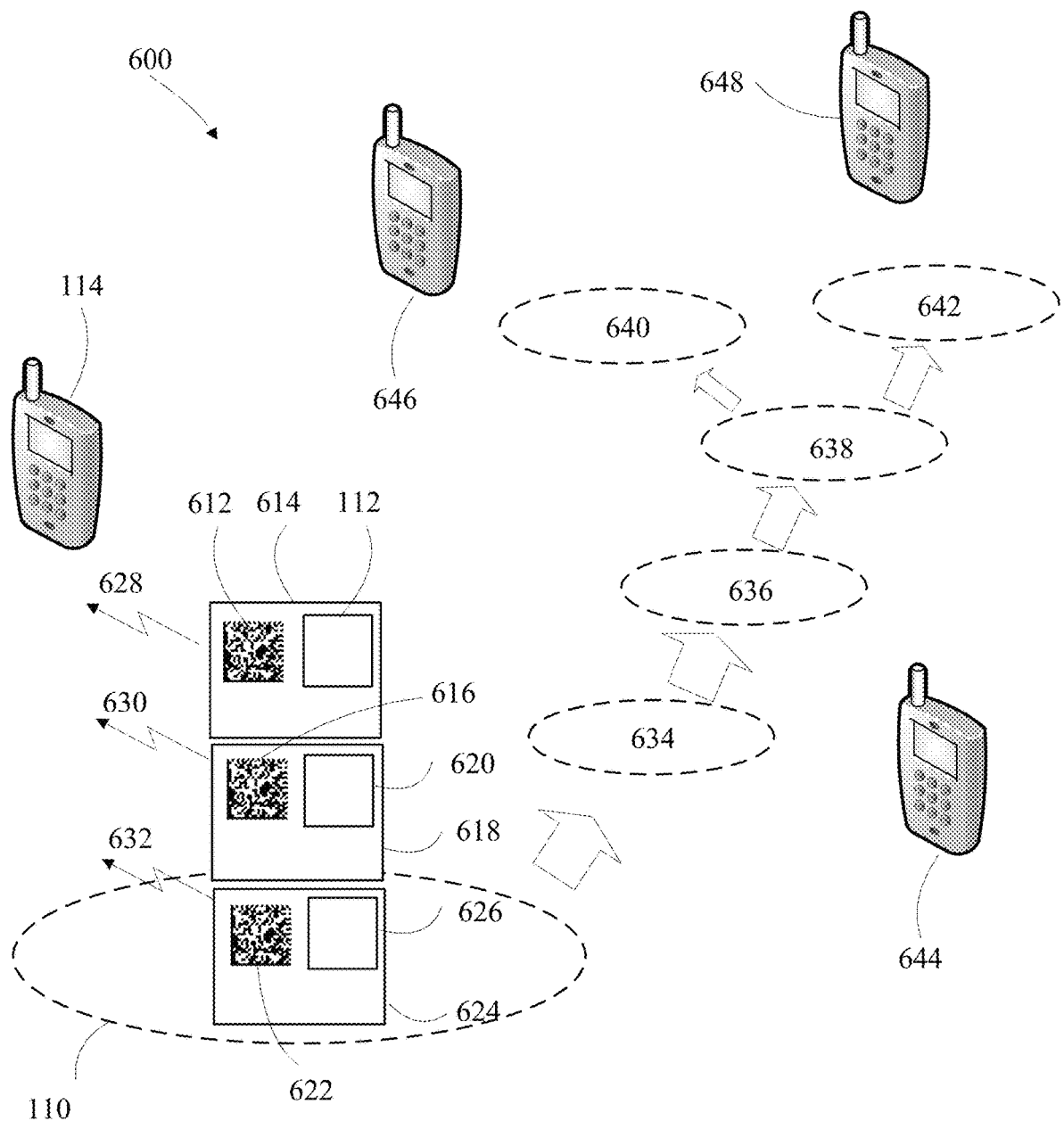
FIG. 6 is a diagram of a first example of creation of a shipment using geo-location of an asset, in accordance with some embodiments.

FIG. 6 depicts a first example of the creation of a shipment using geo-location 600. In this example three assets 614, 618 and 624 have barcodes 612, 616 and 622 respectively and wireless transmitters 112, 620 and 626 respectively emitting wireless signals 628, 630 and 632 respectively from within an origin geo-fence 110 that is the origin of the three assets. Locating the assets within the geo-fence may be accomplished by several means including reception from a proximate mobile device 114, by WiFi, WiMax within the origin and the like. As the assets leave the origin as determined by their movement out of the origin, shipments are created for each asset. Based on a past history of destinations from the previous origin, a past history of the type of asset from previous shipments and proximity of defined destinations that are in the direction of movement of the asset a set of possible destinations 634, 636, 638, 640 and 642 are determined. The movement of the assets may be determined by the reception and relay to the cloud server of the wireless signals 628, 630 and 632 by mobile devices 644, 646 and 648 along the travel route, or may be sent directly by a wireless tracker using cellular signals, WiFi, WiMax or the like. When the assets arrive at a destination and remain there, an invoice is created.

Figure 7:
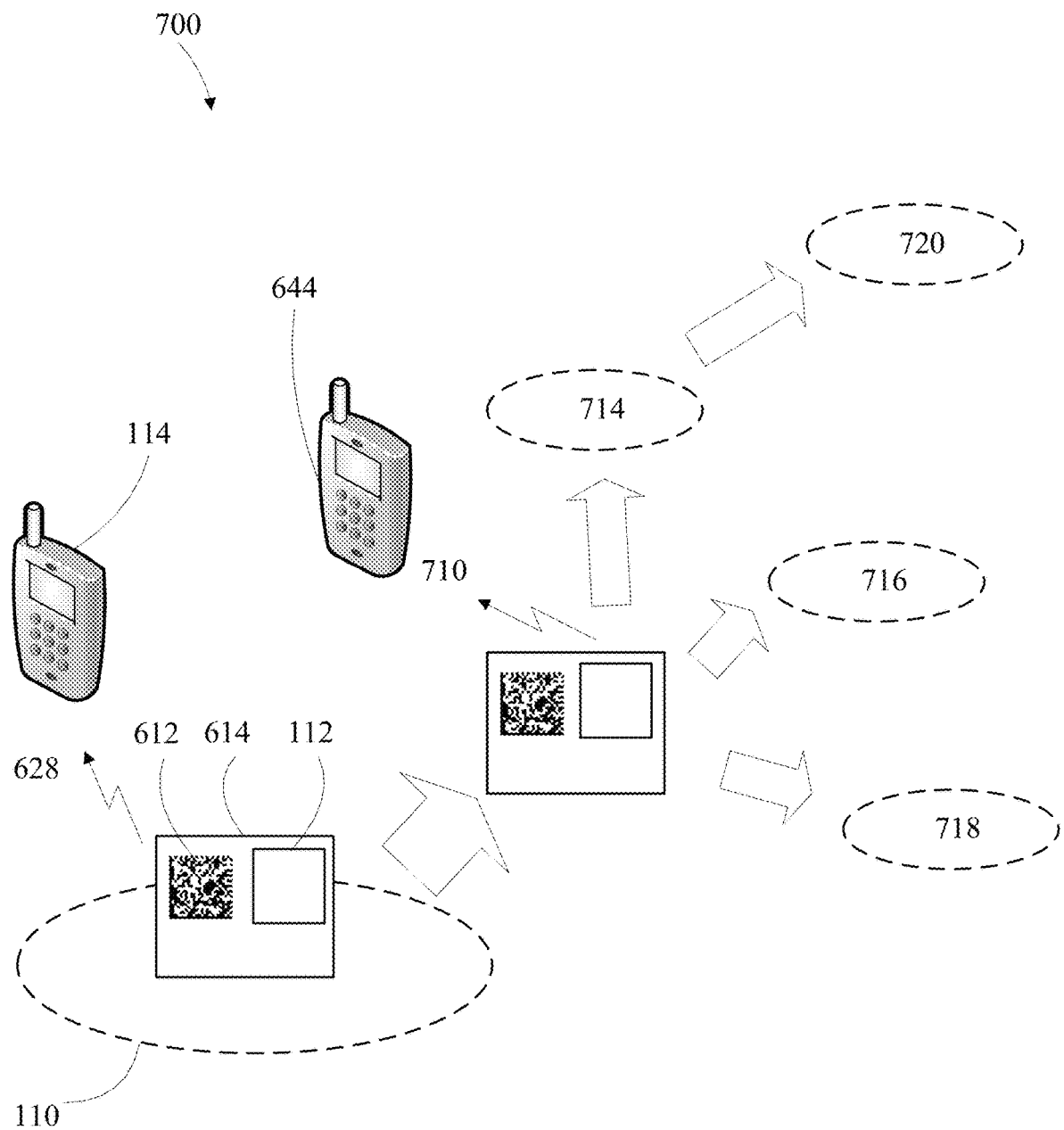
FIG. 7 is a diagram of a second example of creation of a shipment using geo-location of an asset, in accordance with some embodiments.

FIG. 7 depicts a second example of the creation of a shipment using geo-location 700. The asset has a barcode 612 and a wireless tracker 614 emitting a wireless signal 628 from within an origin geo-fence location 110. The wireless signal is received either directly from the wireless tracker or is received by mobile devices 114 or 644. As the asset travels past the origin geo-fence a shipment is created with an unknown destination. The asset continues emitting wireless signal 710 which is relayed either directly or indirectly to the cloud server. The cloud server or local server determines the probable destination 714, 716, 718 and 720 based on based on a past history of destinations from the previous origin, a past history of the type of asset from previous shipments and proximity of defined destinations that are in the direction of movement of the asset.

Figure 8:
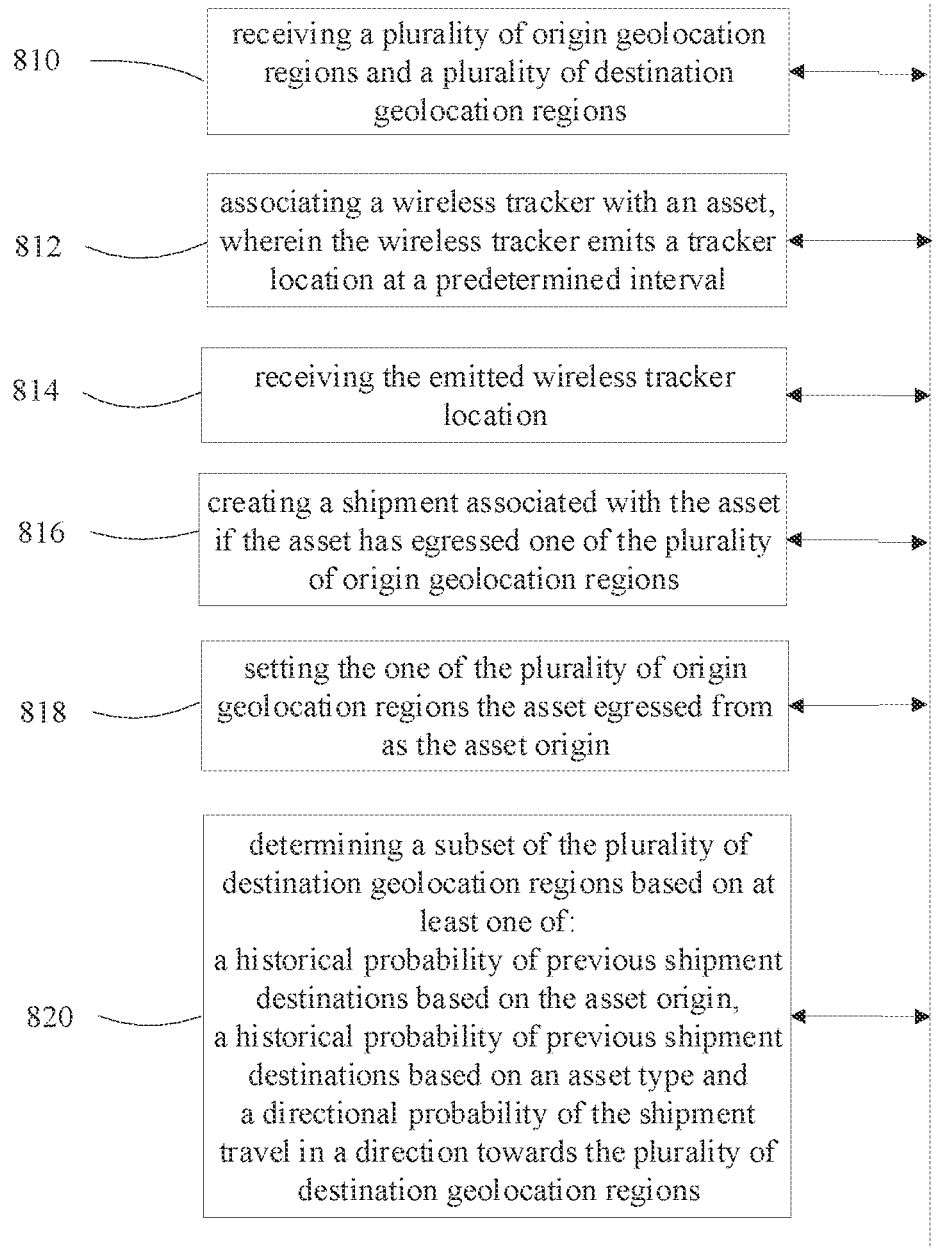
FIG. 8 is a flowchart that illustrates an example method of creation of a shipment using geo-location of an asset, in accordance with some embodiments.

Referring to FIG. 8, an example method 900 including, receiving 810 a plurality of origin geolocation regions and a plurality of destination geolocation regions, associating 812 a wireless tracker with an asset, wherein the wireless tracker emits a tracker location at a predetermined interval and receiving 814 the emitted wireless tracker location. The method also includes creating 816 a shipment associated with the asset if the asset has egressed one of the plurality of origin geolocation regions, setting 818 the one of the plurality of origin geolocation regions the asset egressed from as the asset origin. The method further includes determining 820 a subset of the plurality of destination geolocation regions based on at least one of; a historical probability of previous shipment destinations based on the asset origin, a historical probability of previous shipment destinations based on an asset type and a directional probability of the shipment travel in a direction towards the plurality of destination geolocation regions.

Persons of ordinary skill in the art understand that the steps of methods described herein can be implemented in any order and not limited to the order discussed in the present disclosure. Further, functions implemented by modules within the computer server(s) described herein may also be implemented in the modules of the wireless tracker. In addition, functions implemented by the module of the wireless tracker may also be implemented by the computer server(s). Moreover, functions implemented by modules within the computer server(s) described herein may also be implemented in the modules of the user device. Also, functions implemented by modules within the user device described herein may also be implemented in the modules of the computer server(s).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Additionally, the terms user device and mobile device called out within this document refer to a mobile device which the user utilizes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, via a wireless tracker, a verification code entered into a user interface of the wireless tracker, wherein the wireless tracker is physically attached to cargo located at an origin of shipment;
   verifying the verification code via the wireless tracker;
   determining a plurality of different geographic location values of the wireless tracker at a plurality of different locations and transmitting a plurality of wireless communication signals comprising identifiers of the plurality of different geographic location values from the wireless tracker to a server at periodic intervals;
   determining, by the server, that an asset with the cargo has left the origin of shipment based on the plurality of different geographic location values included within the plurality of wireless signals;
generating a shipment order with an identifier of the origin and without an identifier of a destination via the server and storing the shipment order in a storage device based on the determination that the asset has left the origin of shipment;
starting, by the server, a monitoring trace of the wireless tracker in response to the determination that the asset has moved outside of the origin location;
predicting a destination for the asset from among a plurality of possible destinations based on a pattern of movement identified from a geographic location value included in the plurality of wireless signals received from the wireless tracker;
updating the shipment order stored within the storage device to include an identifier of the predicted destination;
transmitting configuration information, including location data, to the wireless tracker, wherein the location data includes a plurality of locations along a route to the destination at which the wireless tracker provides sensor readings to the server to regulate a battery life of the wireless tracker;
receiving a notification from the wireless tracker indicating the cargo has been diverted from the route and a current location of the cargo;
dynamically determining an action to be taken by the wireless tracker based on the current location of the cargo and the configuration information;
transmitting an identifier of the action to the wireless tracker while the wireless tracker is at the current location;
receiving sensor values from the wireless tracker based on the action; and
iteratively receiving additional wireless signals from the wireless tracker as the wireless tracker moves farther away from the origin location, and updating the shipment order again based on sensor data included in the additional wireless signals.

2. The method of claim 1, further comprising sending at least one recipient of the asset a transit message.

3. The method of claim 1, further comprising generating an invoice when the asset arrives and remains for a predetermined time at a geolocation.

4. The method of claim 1, further comprising sending an alert if the asset remains at a location for a duration longer than a predetermined length of time.

5. The method of claim 1, wherein reception of an emitted wireless tracker location is performed by a cloud server.

6. The method of claim 1, wherein the wireless tracker is a Bluetooth low energy beacon.

7. The method of claim 1, wherein the wireless tracker is a transceiver.

8. A system, comprising:
a wireless tracker attached to cargo located at an origin of shipment, wherein the wireless tracker comprises a user interface and is configured to receive a verification code entered via the user interface, and the wireless tracker is configured to verify the received verification code, determine a plurality of different geographic location values of the cargo at a plurality of different locations, and transmit a plurality of wireless communication signals comprising identifiers of the plurality of different geographic location values, respectively; and
a server that is configured to receive the plurality of wireless communication signals from the wireless tracker via a network of devices, and the server comprises a processor configured to:
determine that an asset with the cargo has left the origin of shipment based on the plurality of different geographic values included within the plurality of wireless signals;
generate a shipment order with an identifier of the origin and without an identifier of a destination and storing the shipment order in a storage device based on the determination that the asset has left the origin of shipment;
start a monitoring trace of the wireless tracker in response to the determination that the asset has moved outside of the origin location;
predict a destination for the asset from among a plurality of possible destinations based on a pattern of movement identified from the plurality of different geographic location values included in the plurality of wireless signals received from the wireless tracker;
update the shipment order stored within the storage device to include an identifier of the predicted destination;
transmit configuration information, with location data, to the wireless tracker, wherein the location data includes a plurality of locations along a route to the destination at which the wireless tracker provides sensor readings to the server to regulate a battery life of the wireless tracker;
receive a notification from the wireless tracker indicating the cargo has been diverted from the route and a current location of the cargo;
dynamically determine an action to be taken by the wireless tracker based on the current location of the cargo and the configuration information;
transmit an identifier of the action to the wireless tracker while the wireless tracker is at the current location;
receive sensor values from the wireless tracker based on the action; and
iteratively receive additional wireless signals from the wireless tracker as the wireless tracker moves farther away from the origin location, and update the shipment order again based on sensor data included in the additional wireless signals.

9. The system of claim 8, wherein the wireless tracker is a Bluetooth low energy beacon.

10. The system of claim 8, wherein the wireless tracker is a transceiver.

11. A non-transitory computer readable medium comprising instructions that, when read by a processor, cause the processor to perform:
receiving, via a wireless tracker, a verification code entered into a user interface of the wireless tracker, wherein the wireless tracker is physically attached to cargo located at an origin of shipment;
verifying the verification code via the wireless tracker;
determining a plurality of different geographic location values of the wireless tracker at a plurality of different locations and transmitting a plurality of wireless communication signals comprising identifiers of the plurality of different geographic location values from the wireless tracker a server at periodic intervals;
determining, by the server, that an asset with the cargo has left the origin of shipment based on the plurality of different the plurality of different the plurality of different geolocation values included within the plurality of wireless signals;

generating a shipment order with the origin and without a destination and storing the shipment order in a storage device based on the determination that the asset has left the origin of shipment;

starting, by the server, a monitoring trace of the wireless tracker in response to the determination that the asset has moved outside of the origin location;

predicting an asset destination among the possible destinations based on a pattern of movement identified from the geolocation values in the plurality of wireless signals received from the wireless tracker;

updating the automatically created shipment order stored within the storage device to include an identifier of the asset destination;

transmitting configuration information, with location data, to the wireless tracker, wherein the location data includes a plurality of locations along a route to the destination at which the wireless tracker provides sensor readings to the server to regulate a battery life of the wireless tracker;

receiving a notification from the wireless tracker indicating the cargo has been diverted from the route and a current location of the cargo;

dynamically determining an action to be taken by the wireless tracker based on the current location of the cargo and the configuration information;

transmitting an identifier of the action to the wireless tracker while the wireless tracker is at the current location;

receiving sensor values from the wireless tracker based on the action; and iteratively receiving additional wireless signals from the wireless tracker as the wireless tracker moves farther away from the origin location, and updating the shipment order based on sensor data included in the additional wireless signals.

12. The non-transitory computer readable medium of claim 11, further comprising sending at least one recipient of the asset a transit message.

13. The non-transitory computer readable medium of claim 11, further comprising generating an invoice when the asset arrives and remains for a predetermined time at a geolocation.

14. The non-transitory computer readable medium of claim 11, further comprising sending an alert if the asset remains at a location for a duration longer than a predetermined length of time.

15. The non-transitory computer readable medium of claim 11, wherein the wireless tracker is one of a transceiver and a Bluetooth low energy beacon.

\* \* \* \* \*